(12) United States Patent
Ceglia et al.

(10) Patent No.: US 10,289,108 B2
(45) Date of Patent: May 14, 2019

(54) METHODS AND APPARATUS FOR MONITORING OPERATION OF A SYSTEM ASSET

(75) Inventors: Kenneth Paul Ceglia, Gardenville, NV (US); Scott Terrell Williams, Minden, NV (US); Charles Terrance Hatch, Gardenville, NV (US); David Michael Robertson, Genoa, NV (US)

(73) Assignee: General Electric Company, Schenectady, NY (US)

( * ) Notice: Subject to any disclaimer, the term of this patent is extended or adjusted under 35 U.S.C. 154(b) by 296 days.

(21) Appl. No.: 13/421,483

(22) Filed: Mar. 15, 2012

(65) Prior Publication Data
US 2013/0246858 A1    Sep. 19, 2013

(51) Int. Cl.
*G07C 3/00* (2006.01)
*G05B 23/02* (2006.01)
*G06F 11/32* (2006.01)

(52) U.S. Cl.
CPC .......... *G05B 23/0272* (2013.01); *G05B 2219/23151* (2013.01); *G06F 11/328* (2013.01); *G07C 3/00* (2013.01)

(58) Field of Classification Search
CPC ...... G06F 11/0766; G06F 11/30; G06F 11/22; G06F 11/3055; G06F 11/3058; G06F 11/32; G06F 11/321; G06F 11/324; G06F 11/327; G06F 11/328; G05B 23/0267; G05B 23/0272
See application file for complete search history.

(56) References Cited

U.S. PATENT DOCUMENTS

| | | | |
|---|---|---|---|
| 4,812,819 A * | 3/1989 | Corsberg | 340/517 |
| 5,025,143 A * | 6/1991 | Dayhoff | 250/203.3 |
| 5,590,062 A | 12/1996 | Nagamitsu et al. | |
| 7,567,844 B2 | 7/2009 | Thomas et al. | |
| 7,676,294 B2 | 3/2010 | Baier et al. | |
| 8,026,933 B2 | 9/2011 | Baier et al. | |
| 9,299,241 B1 * | 3/2016 | Monical | G08B 23/00 |
| 2002/0029134 A1 | 3/2002 | Friedrich et al. | |

(Continued)

FOREIGN PATENT DOCUMENTS

EP    0389132 A2    9/1990

OTHER PUBLICATIONS

Office Action issued in connection with corresponding DK Application No. PA 201370154 dated Sep. 24, 2014.

*Primary Examiner* — Gabriel Chu
(74) *Attorney, Agent, or Firm* — Mintz Levin Cohn Ferris Glovsky and Popeo, P.C.

(57) ABSTRACT

A device for use in monitoring operation of a plurality of system assets includes a storage device configured to store a model of a plurality of system assets and a processor coupled to the storage device. The processor is configured to receive data representative of a status of the system assets, and display, in a first display state, a plurality of asset images representative of the system assets using the model. The processor is also configured to display, in a second display state, a first asset image of the asset images within the display upon a determination that the system asset represented by first asset image is in an alarm state, and display, in a third display state, the remaining asset images within the display upon a determination that the system assets represented by the remaining asset images are not in an alarm state.

22 Claims, 3 Drawing Sheets

(56) References Cited

U.S. PATENT DOCUMENTS

| | | | |
|---|---|---|---|
| 2004/0090467 A1* | 5/2004 | Bonura et al. | 345/790 |
| 2004/0259276 A1* | 12/2004 | Yue et al. | 438/5 |
| 2005/0248560 A1* | 11/2005 | Agrawala | G06T 19/00 345/418 |
| 2006/0190584 A1 | 8/2006 | Skold et al. | |
| 2007/0165964 A1* | 7/2007 | Wolf et al. | 382/276 |
| 2008/0062167 A1 | 3/2008 | Boggs et al. | |
| 2009/0216341 A1* | 8/2009 | Enkerud et al. | 700/17 |
| 2009/0268029 A1 | 10/2009 | Haussmann et al. | |
| 2009/0319058 A1 | 12/2009 | Rovaglio et al. | |
| 2010/0123594 A1* | 5/2010 | Schleiss et al. | 340/679 |
| 2011/0075257 A1 | 3/2011 | Hua et al. | |
| 2011/0193704 A1* | 8/2011 | Harper et al. | 340/573.1 |
| 2011/0273437 A1* | 11/2011 | Sanderson | H04N 13/398 345/419 |
| 2012/0268262 A1* | 10/2012 | Popovic | B60Q 9/008 340/438 |
| 2013/0152003 A1* | 6/2013 | Ricci et al. | 715/765 |
| 2016/0070456 A1* | 3/2016 | Ricci | H04W 4/90 715/763 |

\* cited by examiner

METHODS AND APPARATUS FOR MONITORING OPERATION OF A SYSTEM ASSET

BACKGROUND OF THE INVENTION

The present application relates generally to systems and, more particularly, to methods and apparatus for use in monitoring operation of a system asset.

At least some known power systems include a plurality of components, such as generators, motors, fans, and/or other components. Such components are often stored or positioned within a building such as a power plant or a factory. A building may include a large enough number of components such that a user may have difficulty locating desired components and/or navigating to desired components. For example, a desired component may be positioned behind and/or may be obscured by another component such that the desired component is not easily seen.

Moreover, during operation of the power system, one or more components may experience a failure or may operate outside of accepted boundaries. Such a component may enter an alarm state to alert a user to the failure or the unacceptable operating conditions.

To facilitate monitoring system components, at least some known systems are modeled using virtual representations of the system components. Such models may include representations of the system components and may display a status of the components. However, such system models may include too much information such that desired information is obscured. For example, if a component enters an alarm state, the status of the component may be overshadowed or obscured by status information of the other system components. Accordingly, a user may find it difficult to identify alarming components within such system models.

BRIEF DESCRIPTION OF THE INVENTION

In one embodiment, a device for use in monitoring operation of a plurality of system assets is provided that includes a storage device configured to store a model of a plurality of system assets and a processor coupled to the storage device. The processor is configured to receive data representative of a status of the plurality of system assets, and display, in a first display state, a plurality of asset images on a display using the model, wherein the plurality of asset images are representative of the plurality of system assets. The processor is also configured to display, in a second display state, a first asset image of the plurality of asset images within the display upon a determination that the system asset represented by first asset image is in an alarm state, and display, in a third display state, the remaining asset images of the plurality of asset images within the display upon a determination that the system assets represented by the remaining asset images are not in an alarm state. Displaying the first asset image in the second display state causes the first asset image to be emphasized with respect to the display of the asset images in the first display state, and displaying the remaining asset images in the third display state causes the remaining asset images to be de-emphasized with respect to the display of the asset images in first display state.

In another embodiment, a system is provided that includes a data acquisition device for determining a status of a plurality of system assets and a computing device coupled to the data acquisition device. The computing device includes a storage device configured to store a model of the plurality of system assets and a processor coupled to the storage device. The processor is configured to receive data representative of the status of the plurality of system assets from the data acquisition device, and display, in a first display state, a plurality of asset images on a display using the model, wherein the plurality of asset images are representative of the plurality of system assets. The processor is also configured to display, in a second display state, a first asset image of the plurality of asset images within the display upon a determination that the system asset represented by first asset image is in an alarm state, and display, in a third display state, the remaining asset images of the plurality of asset images within the display upon a determination that the system assets represented by the remaining asset images are not in an alarm state. Displaying the first asset image in the second display state causes the first asset image to be emphasized with respect to the display of the asset images in the first display state, and displaying the remaining asset images in the third display state causes the remaining asset images to be de-emphasized with respect to the display of the asset images in first display state.

In yet another embodiment, a method of monitoring operation of a plurality of system assets is provided that includes receiving data representative of a status of a plurality of system assets and displaying, on a display in a first display state, a plurality of asset images that are representative of the plurality of system assets. The method also includes displaying, in a second display state, a first asset image of the plurality of asset images within the display upon a determination that the system asset represented by first asset image is in an alarm state, and displaying, in a third display state, the remaining asset images of the plurality of asset images within the display upon a determination that the system assets represented by the remaining asset images are not in an alarm state. Displaying the first asset image in the second display state causes the first asset image to be emphasized with respect to the display of the asset images in the first display state, and displaying the remaining asset images in the third display state causes the remaining asset images to be de-emphasized with respect to the display of the asset images in first display state.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
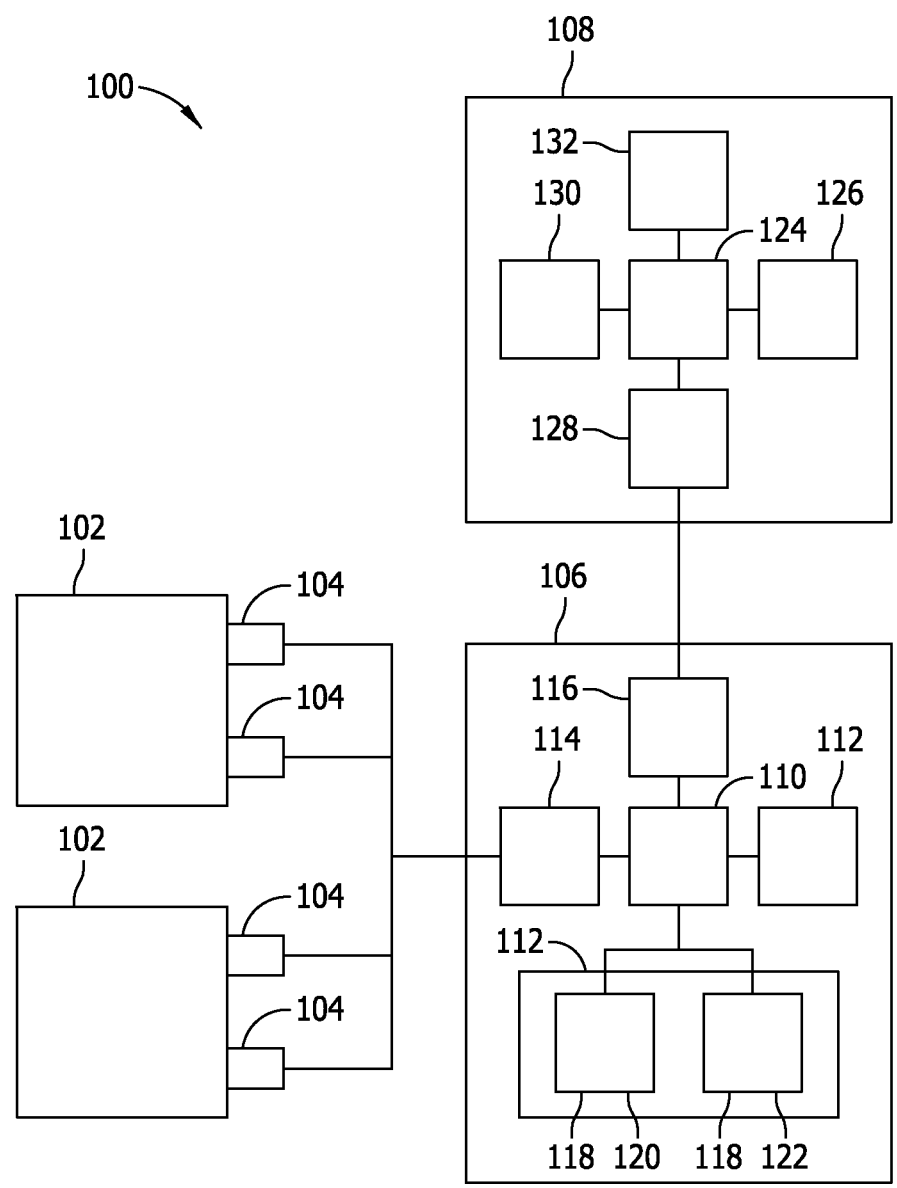
FIG. 1 is a block diagram of an exemplary system including a plurality of system assets.

FIG. 1 is a block diagram of an exemplary system 100 that includes a plurality of system assets 102. In the exemplary embodiment, system 100 may be, or may include, a factory, an industrial system or facility, a mill, a refinery, a manufacturing facility, a power generation plant or facility, and/or any other system that includes a plurality of system assets 102. System assets 102 may include, but are not limited to only including, machines, motors, generators, pumps, fans, computer systems or devices, sensors, and/or any other device or machine that enables system 100 to function as described herein.

In the exemplary embodiment, at least one sensor 104 is coupled to at least one system asset 102 for use in measuring an operating condition of asset 102. For example, if asset 102 is a rotating machine, sensors 104 may measure a vibration of a drive shaft of the machine, a rotational frequency or speed of the drive shaft, a temperature of the machine, a pressure within the machine, and/or any other operating condition of any component or device that enables system 100 to function as described herein.

System 100 also includes a data acquisition device 106 and a computing device 108 that is coupled to data acquisition device 106. In the exemplary embodiment, data acquisition device 106 includes a processor 110 coupled to one or more memory devices 112, a sensor interface 114, a communication interface 116, and one or more databases 118.

Processor 110 includes any suitable programmable circuit including one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein. The above examples are exemplary only, and thus are not intended to limit in any way the definition and/or meaning of the term "processor."

Memory device 112 is a storage device that includes a computer readable storage medium, such as, without limitation, random access memory (RAM), flash memory, a hard disk drive, a solid state drive, a diskette, a flash drive, a compact disc, a digital video disc, and/or any suitable memory. In the exemplary embodiment, memory device 112 includes data and/or instructions that are executable by processor 110 (i.e., processor 110 is programmed by the instructions) to enable processor 110 to perform the functions described herein.

Sensor interface 114 is coupled to sensors 104 for receiving signals representative of measured operating conditions of assets 102. More specifically, sensor interface 114 receives signals from sensors 104 via a wireless connection and/or via a wired connection to sensors 104. In the exemplary embodiment, sensor interface 114 converts and/or adjusts the signals received from sensors 104 for use with processor 110. In one embodiment, sensor interface 114 includes an analog-to-digital converter (ADC) that converts analog signals received from sensors 104 to digital data representative of the measured operating conditions (hereinafter referred to as "asset measurement data"), and the asset measurement data is transmitted to processor 110. In the exemplary embodiment, data acquisition device 106 determines a status of each system asset 102 based on the asset measurement data received.

Communication interface 116 may include, without limitation, a network interface controller (NIC), a network adapter, a transceiver, or any other communication interface or device that enables data acquisition device 106 to operate as described herein. In the exemplary embodiment, communication interface 116 may connect to computing device 108 using any suitable wired or wireless network and/or communication protocol.

Databases 118 include a measurement database 120 and a model database 122. Alternatively, databases 118 may include any other database, and/or measurement database 120 and model database 122 may be combined into one database 118. In one embodiment, databases 118 are included within one or more memory devices 112. Alternatively, databases 118 are included within one or more remote storage devices, such as a network attached storage (NAS) device, an external hard drive, a remote computing device, and/or any other storage device that enables data acquisition device 106 to function as described herein.

In the exemplary embodiment, processor 110 stores asset measurement data received from sensors 104 in measurement database 120. In one embodiment, measurement database 120 stores historical asset measurement data for each asset 102 during a predefined period of time. Moreover, processor 110 (or another device) stores components of a model (not shown in FIG. 1) of system 100 and/or system assets 102 in model database 122. In the exemplary embodiment, the model components include data associated with each system asset 102. For example, the model components may include an image or a graphical representation of each asset 102, a location of each asset 102, an identifier for each asset 102, one or more connections to other assets 102, operating condition thresholds and/or alarm thresholds for each asset 102, and/or any other data associated with system assets 102. In one embodiment, a user or an administrator may input the model components into model database 122 for use in creating a model of system 100. As used herein, the term "model" refers to a visual representation of a system or a component. For example, the model may be a computer-based representation that displays a graphical indicator representing a type, identity, location, and/or any other characteristic of the system or component.

In the exemplary embodiment, computing device 108 is coupled to data acquisition device 106 for receiving data from data acquisition device 106 and/or displaying a model of system 100. Computing device 108 includes a processor 124 coupled to a memory device 126, a communication interface 128, a user input device 130, and a display 132. In the exemplary embodiment, computing device 108 is a mobile device, such as a laptop, a smartphone, a personal digital assistant (PDA), a tablet computer, and/or any other device that functions as described herein. Alternatively, computing device 108 is a desktop computer, a server computer, and/or any other computing device that enables system 100 to function as described herein.

Processor 124 includes any suitable programmable circuit including one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein. The above examples are exemplary only, and thus are not intended to limit in any way the definition and/or meaning of the term "processor."

Memory device 126 includes a computer readable storage medium, such as, without limitation, random access memory (RAM), flash memory, a hard disk drive, a solid state drive, a diskette, a flash drive, a compact disc, a digital video disc, and/or any suitable memory. In the exemplary embodiment, memory device 126 includes data and/or instructions that are executable by processor 124 (i.e., processor 124 is programmed by the instructions) to enable processor 124 to perform the functions described herein.

Communication interface 128 may include, without limitation, a network interface controller (NIC), a network adapter, a transceiver, or any other communication interface or device that enables computing device 108 to operate as described herein. In the exemplary embodiment, communication interface 128 may connect to data acquisition device 106 using any suitable wired or wireless network and/or communication protocol.

User input device 130 includes, without limitation, a keyboard, a keypad, a touch-sensitive screen, a mouse, a scroll wheel, a pointing device, an audio input device employing speech-recognition software, and/or any suitable device that enables a user to input data into computing device 108 and/or retrieve data from computing device 108. Display 132 includes, without limitation, a liquid crystal display (LCD), a vacuum fluorescent display (VFD), a cathode ray tube (CRT), a plasma display, a light-emitting diode (LED) display, one or more LEDs, and/or any suitable visual output device capable of displaying graphical data and text to a user. In one embodiment, display 132 may be a touch-sensitive screen that incorporates aspects of user input device 130, for example, by enabling a user to input data and/or commands through the screen.

During operation, sensor interface 114 of data acquisition device 106 receives sensor measurement signals from sensors 104 and converts the signals into asset measurement data that is stored (by processor 110) in measurement database 120. Data acquisition device 106 also receives or generates a plurality of model components representative of one or more aspects of system assets 102, and stores the model components in model database 122. The model components and asset measurement data are transmitted to computing device 108 via communication interface 116.

In the exemplary embodiment, computing device 108 receives the model components and asset measurement data from data acquisition device 106 and stores the components and data (and/or a cached version of the components and/or data) in memory device 126. Processor 124 retrieves the model components and asset measurement data from memory device 126 and displays, in a first display state, the model of system 100 on display 132 based on the model components and/or asset measurement data. Moreover, in the exemplary embodiment, processor 124 displays, in a second state (or emphasizes), a display of an image of a system asset 102 that is in an alarm state, and displays, in a third state (or de-emphasizes), the display of the images of system assets 102 that are not in the alarm state, as described more fully herein.

As used herein, the term "alarm state" refers to a state or a condition in which an operating condition of a system asset 102 exceeds an operating condition threshold or an alarm threshold, the operating condition of the system asset 102 exceeds an operating condition of another system asset 102 by a predetermined amount, the operating condition of the system asset 102 exceeds an operating condition threshold or an alarm threshold for a predetermined amount of time, and/or when any other condition is satisfied that indicates system asset 102 is operating in an unsatisfactory manner.

Figure 2:
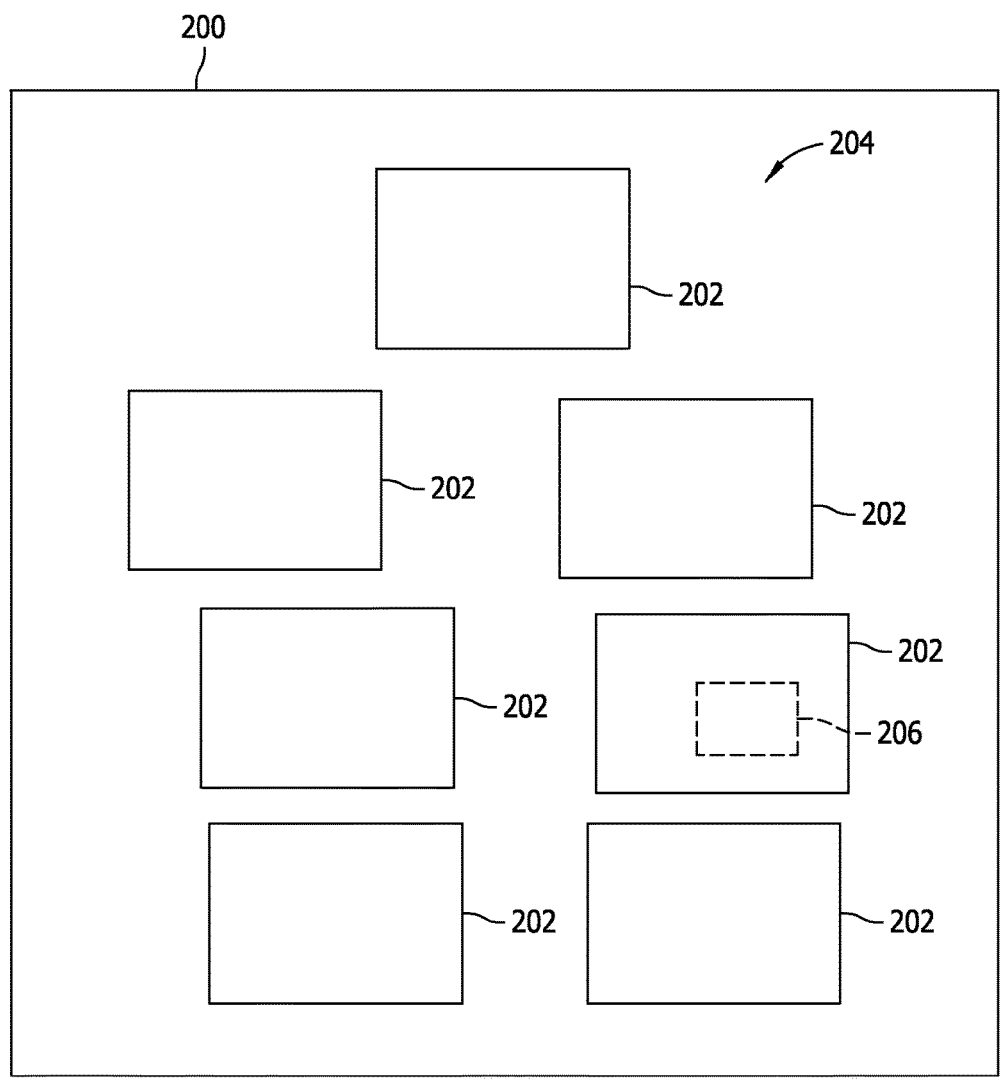
FIG. 2 is a block diagram of an exemplary model of the system shown in FIG. 1.

FIG. 2 is a block diagram of an exemplary graphical representation 200, or model 200, of a system, such as system 100 (shown in FIG. 1). In the exemplary embodiment, model 200 is stored within memory device 126 and/or displayed by display 132 of computing device 108 (shown in FIG. 1). Alternatively or additionally, model 200 may be stored within, and/or displayed by, at least one device or system remote from computing device 108, such as data acquisition device 106.

In the exemplary embodiment, model 200 displays a representation or image (hereinafter referred to as an "asset image 202") of at least one system asset 102 (shown in FIG. 1) on display 132. More specifically, model 200 displays a location 204 or position of each system asset 102 within model 200, for example, by positioning each asset image 202 within model 200 at a location 204 corresponding to system asset 102 associated with asset image 202. Accordingly, a position of each asset image 202 within model 200 corresponds to a position, within system 100, of each system asset 102 associated with, or represented by, asset image 202. In the exemplary embodiment, model 200 may be represented as a two-dimensional display or as a three-dimensional (3D) display of asset images 202 and/or system 100. For example, model 200 may be a stereoscopic 3D display of asset images 202 that enables a user to view a virtual representation of system 100 on display 132.

Model 200 may include one or more hidden asset images 206 that are obscured by other asset images 202. Such hidden asset images 206 may be displayed and/or viewed within model 200 if asset image 202 obscuring hidden asset image 206 is de-emphasized, as described more fully herein.

In the exemplary embodiment, model 200 is generated by mapping each system asset 102 with a physical location. For example, a user may use a global positioning satellite (GPS) enabled camera and/or another device to identify a physical location of system asset 102, and automatically and/or manually associate the physical location of system asset 102 with an associated asset image 202 within model 200. In addition, data associated with system asset 102, such as asset measurement data, operating conditions, process parameters, a status of asset 102, and/or any other details may be associated with asset image 202. The data associated with each system asset 102 may be accessed and/or displayed by selecting the associated asset image 202 within model 200. For example, a user may select an asset image 202 using user input device 130 to receive data associated with system asset 102.

At least some portions of model 200 and/or asset images 202 may be emphasized or de-emphasized based on signals or data received from processor 124 and/or from a remote device, such as data acquisition device 106. As used herein, the term "emphasize" refers to displaying one or more asset images 202 in a more visible or pronounced manner as compared to a first display state of the asset images 202. For example, the first display state may indicate a "normal" display state in which no system assets 102 are determined to be in an alarm state. If an asset image 202 is associated with a system component 102 that is determined to be in an alarm state, asset image 202 may be displayed in a second display state that causes asset image 202 to be emphasized with respect to a display of asset images 202 in the first (or non-emphasized) display state. As used herein, the term "de-emphasize" refers to displaying one or more asset images 202 in a less visible or less pronounced manner with respect to the first display state (and with respect to the second display state). Accordingly, asset images 202 associated with system components 102 that are not determined to be in an alarm state may be displayed in a third display state that causes asset images 202 to be de-emphasized with respect to the display of asset images 202 in the first display state.

For example, one or more asset images 202, or one or more portions thereof, may be emphasized by highlighting asset image 202 in a brighter or more visible color in contrast to the color of other asset images 202 within model 200, by increasing an opacity of asset image 202, by increasing a contrast or brightness of asset image 202 with respect to other asset images 202, and/or by any other manner that enables model 200 to function as described herein. Moreover, asset image 202 may be emphasized by causing asset image 202 to "flash," or alternatively be displayed between two display states (e.g., between the second display state and the first display state) such as between two colors, color intensities or brightness, or any other display states having any of the above display characteristics. Asset image 202 may continuously alternate between the two, or more than two, display states with a frequency based on a severity of the alarm state. For example, if the alarm state is not determined to be severe, asset image 202 may alternate between the display states at a first frequency. If the alarm state is determined to be severe, asset image 202 may alternative between the display states at a second frequency that is faster than the first frequency. In the exemplary embodiment, asset image 202 is emphasized based on a status of system asset 102 represented by image 202, such as when asset measurement data and/or other data indicates that system asset 102 is in an alarm state.

Moreover, in the exemplary embodiment, one or more asset images 202 may be de-emphasized, such as by being reduced in opacity (i.e., made transparent or partially transparent), displayed in a reduced color palette (or "grayed out"), and/or by not being displayed in model 200. More specifically, asset images 202 that are not identified as being in the alarm state are automatically de-emphasized, for example, when another asset image 202 is identified as being in the alarm state. In the exemplary embodiment, a change in the status of system asset 102 (e.g., entering or exiting the alarm state) may cause the display of asset image 202 to be changed (e.g., may cause asset image 202 to be emphasized or de-emphasized). Moreover, an asset image 202 that is not associated with a system asset 102 in an alarm state may be reduced in opacity if asset image 202 obscures another asset image 202, such as a hidden asset image 206 of a system asset 102 in an alarm state.

In the exemplary embodiment, model 200 may increasingly and/or decreasingly emphasize and/or de-emphasize asset images 202 based on asset measurement data and/or any other data received. For example, model 200 may increasingly emphasize asset image 202 (e.g., by increasing a brightness or color saturation of asset image 202) as the associated system asset 102 continues in the alarm state, and/or may emphasize asset image 202 in increasing degrees based on the severity of the alarm state. In a similar manner, model 200 may reduce the emphasis of asset image 202 if the severity of the alarm state decreases or if an operating condition of system asset 102 is reduced such that the condition "trends" towards, or becomes closer to, the operating condition threshold or alarm threshold.

In the exemplary embodiment, a user can select an emphasized asset image 202 (or any other asset image 202) to obtain data associated with the system asset 102 represented by asset image 202. For example, the user can select an asset image 202 that is in the alarm state to receive asset measurement data for system asset 102 and/or any other information related to system asset 102.

Figure 3:
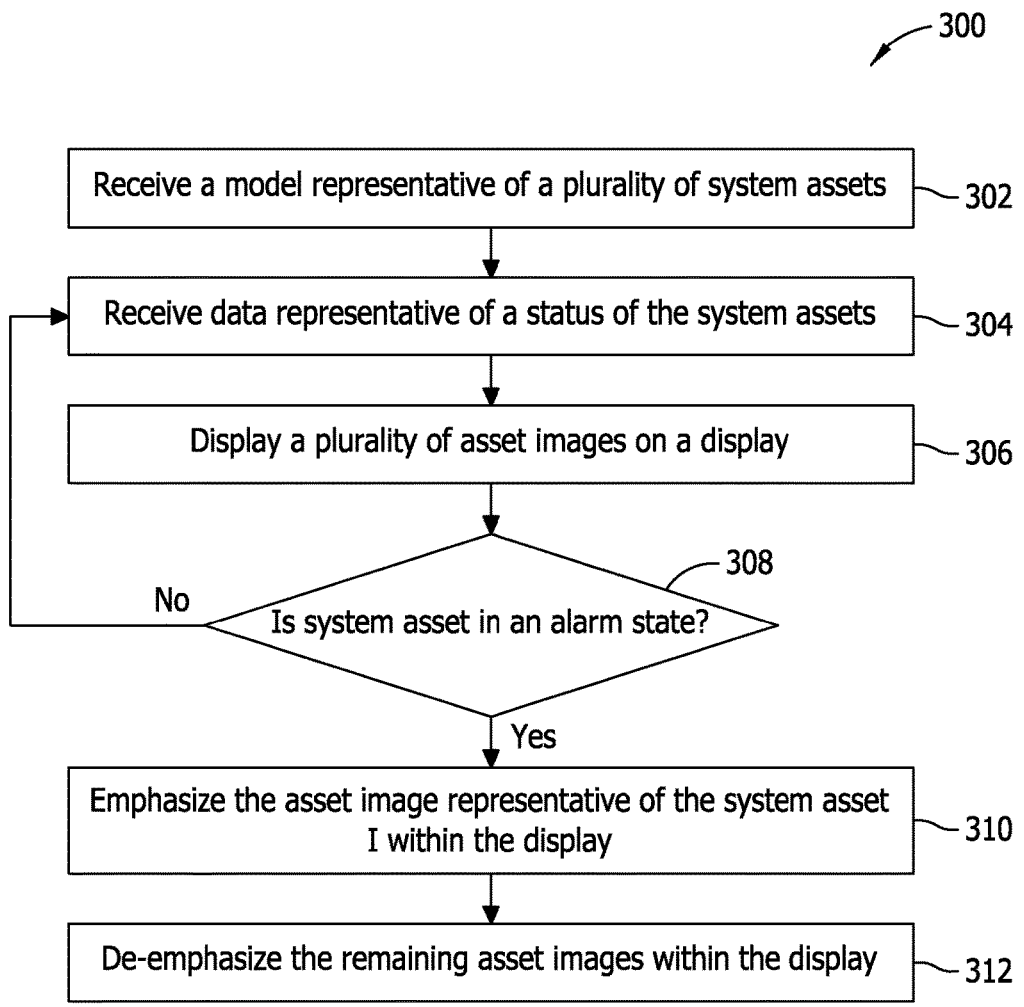
FIG. 3 is a flow diagram of an exemplary method that may be implemented to monitor the operation of a plurality of system assets used with the system shown in FIG. 1.

FIG. 3 is a flow diagram of an exemplary method 300 for monitoring operation of a plurality of assets of a system, such as system assets 102 of system 100 (both shown in FIG. 1). In the exemplary embodiment, method 300 is embodied within a plurality of computer-executable instructions stored within memory device 126 of computing device 108 (both shown in FIG. 1), and is executed by processor 124 (shown in FIG. 1) of computing device 108.

In the exemplary embodiment, method 300 includes receiving 302 a model (such as model 200 shown in FIG. 2) representative of a plurality of system assets 102. In the exemplary embodiment, model 200 is stored in memory device 126. Data representative of a status of each system asset 102 is received 304, for example, from data acquisition device 106 (shown in FIG. 1) and the data is stored in memory device 126.

A plurality of asset images 202 (shown in FIG. 2) are displayed 306 on a display, such as display 132 (shown in FIG. 1). Each asset image 202, in the exemplary embodiment, is representative of a system asset 102. Accordingly, each asset image 202 represents a location of system asset 102 within system 100, and may be selected to receive data associated with system asset 102.

In the exemplary embodiment, processor 124 determines 308 whether a system asset 102 is in an alarm state. For example, processor 124 may receive a signal from data acquisition device 106 or from another device indicating that an operating condition of one or more system assets 102 has exceeded an operating condition threshold, or has otherwise entered an alarm state. If no system asset 102 is determined 308 to be in an alarm state, method 300 returns to receiving 304 data representative of the status of system assets 102.

If a system asset 102 is determined 308 to be in an alarm state, asset image 202 representative of system asset 102 is emphasized 310 within display 132 (e.g., within model 200), as described above with reference to FIG. 2. Moreover, remaining asset images 202 (i.e., asset images 202 representing system assets 102 that are determined to not be in an alarm state) are de-emphasized 312 within display 132, as described above with reference to FIG. 2. Accordingly, information relating to system assets 102 that are in an alarm state is facilitated to be easily viewed by a user without the information being obscured by other asset images 202 within model 200.

A technical effect of the systems and method described herein includes at least one of (a) receiving data representative of a status of a plurality of system assets; (b) displaying, on a display in a first display state, a plurality of asset images that are representative of a plurality of system assets; (c) displaying, in a second display state, a first asset image of a plurality of asset images within a display upon a determination that a system asset represented by the first asset image is in an alarm state; and (d) displaying, in a third display state, asset images of a plurality of asset images within a display upon a determination that system assets represented by the asset images are not in an alarm state. Displaying the first asset image in the second display state causes the first asset image to be emphasized with respect to the display of the asset images in the first display state, and displaying the remaining asset images in the third display state causes the remaining asset images to be de-emphasized with respect to the display of the asset images in first display state.

The system described herein efficiently and robustly displays status information for a plurality of system assets. A model of the system assets is provided and displayed on a display. A plurality of asset images is included within the model, and each asset image represents a system asset. If a system asset is determined to be in an alarm state, the asset image associated with the system asset is emphasized within the display. Conversely, the asset images associated with the remaining system assets that are not in an alarm state are de-emphasized within the display. Accordingly, a user may quickly and efficiently identify system assets that are in an alarm state without having the asset images of remaining system assets obscure the asset image of the system asset in the alarm state. Moreover, the user may select an asset image of a system asset in the alarm state to receive additional data associated with the system asset, thus facilitating troubleshooting and analysis of the system.

Exemplary embodiments of methods and apparatus for use in monitoring operation of a plurality of system assets are described above in detail. The methods and apparatus are not limited to the specific embodiments described herein, but rather, components of the apparatus and/or steps of the methods may be utilized independently and separately from other components and/or steps described herein. For example, the computing device may also be used in combination with other systems and methods, and is not limited to practice with only the system or the data acquisition device as described herein. Rather, the exemplary embodiment can be implemented and utilized in connection with many other power system or industrial applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A device for use in monitoring operation of a plurality of system assets, said device comprising:
    a storage device configured to store a model of a plurality of system assets of a system including location data representative of a physical location of each of the plurality of system assets within the system, the location data including a physical location identified by a global positioning satellite; and
    a processor coupled to said storage device, said processor configured to:
        receive data representative of a status of the plurality of system assets and the location data;
        display, in a first display state, a plurality of asset images on a display using the model, wherein the plurality of asset images are representative of the plurality of system assets;
        display, in a second display state, a first asset image of the plurality of asset images within the display upon a determination that a first system asset represented by the first asset image is in an alarm state, wherein displaying the first asset image in the second display state causes the first asset image to be emphasized with respect to the display of the plurality of asset images in the first display state;
        display, in a third display state, the remaining asset images of the plurality of asset images within the display upon a determination that the system assets represented by the remaining asset images are not in an alarm state, wherein displaying the remaining asset images in the third display state causes the remaining asset images to be de-emphasized with respect to the display of the plurality of asset images in first display state;
        hide, in a fourth display state, a second asset image by obscuring the second asset image with a third asset image, wherein the third asset image comprises an image of a machinery; and
        display in a fifth display state, the second asset image by de-emphasizing the third asset image upon a determination that a second system asset represented by the second asset image is in the alarm state,
    wherein the plurality of asset images comprise at least one of a machine image; and
    wherein each of the plurality of asset images is displayed on the display at a location that corresponds to its physical position within the system.

2. A device in accordance with claim 1, wherein said processor is configured to display the first asset image in the second display state by alternatingly displaying the first asset image in the second display state and the first display state.

3. The device of claim 2, wherein said processor is configured to vary a frequency of the alternation based on a severity of the alarm state.

4. A device in accordance with claim 1, wherein said processor is configured to display the first asset image in the second display state based on at least one of a severity of the alarm state and an amount of time that the first system asset represented by the first asset image is in the alarm state.

5. A device in accordance with claim 4, wherein said processor is configured to reduce an emphasis of the first asset image within the second display state if a severity of the alarm state is reduced.

6. A device in accordance with claim 1, wherein said processor is configured to display the remaining asset images in the third display state by at least one of reducing an opacity of the remaining asset images and reducing a color palette used to display the remaining asset images.

7. A device in accordance with claim 1, wherein said processor is configured to select the first asset image and to receive measurement data for the first system asset represented by the first asset image.

8. A device in accordance with claim 7, wherein said processor is configured to select the first asset image based on a user input.

9. The device of claim 1, wherein the model is a stereoscopic three-dimensional (3D) representation.

10. A system comprising:
    a data acquisition device for determining a status of a plurality of system assets; and
    a computing device coupled to said data acquisition device, said computing device comprising:
        a storage device configured to store a model of the plurality of system assets of a system including location data representative of a physical location of each of the plurality of system assets within the system, the location data including a physical location identified by a global positioning satellite; and
        a processor coupled to said storage device, said processor configured to:
            receive data representative of the status of the plurality of system assets from said data acquisition device and the location data;
            display, in a first display state, a plurality of asset images on a display using the model, wherein the plurality of asset images are representative of the plurality of system assets;
            display, in a second display state, a first asset image of the plurality of asset images within the display upon a determination that a first system asset represented by the first asset image is in an alarm state, wherein displaying the first asset image in the second display state causes the first asset image to be emphasized with respect to the display of the plurality of asset images in the first display state;

display, in a third display state, the remaining asset images of the plurality of asset images within the display upon a determination that the system assets represented by the remaining asset images are not in an alarm state, wherein displaying the remaining asset images in the third display state causes the remaining asset images to be de-emphasized with respect to the display of the plurality of asset images in first display state;

hide, in a fourth display state, a second asset image by obscuring the second asset image with a third asset image; and display in a fifth display state, the second asset image by de-emphasizing the third asset image upon a determination that a second system asset represented by the second asset image is in the alarm state, wherein the plurality of asset images comprise at least one of a machine image; and wherein each of the plurality of asset images is displayed on the display at a location that corresponds to its physical position within the system.

11. A system in accordance with claim 10, wherein said processor is configured to display the first asset image in the second display state by alternatingly displaying the first asset image in the second display state and the first display state.

12. A system in accordance with claim 10, wherein said processor is configured to display the first asset image in the second display state based on at least one of a severity of the alarm state and an amount of time that the first system asset represented by the first asset image is in the alarm state.

13. A system in accordance with claim 12, wherein said processor is configured to reduce an emphasis of the first asset image within the second display state if a severity of the alarm state is reduced.

14. A system in accordance with claim 10, wherein said processor is configured to display the remaining asset images in the third display state by at least one of reducing an opacity of the remaining asset images and reducing a color palette used to display the remaining asset images.

15. A system in accordance with claim 10, wherein said processor is configured to select the first asset image and to receive measurement data for the first system asset represented by the first asset image.

16. A system in accordance with claim 15, wherein said processor is configured to select the first asset image based on a user input.

17. A method of monitoring operation of a plurality of system assets, said method comprising:

receiving data representative of a status of a plurality of system assets of a system and location data representative of a physical location of each of the plurality of system assets within the system, the physical location identified by a global positioning system satellite (GPS) enabled camera;

associating the physical location of each system asset with an associated asset image;

displaying, in a first display state on a display, a plurality of asset images that are representative of the plurality of system assets;

displaying, in a second display state, a first asset image of the plurality of asset images within the display upon a determination that a first system asset represented by the first asset image is in an alarm state, wherein displaying the first asset image in the second display state causes the first asset image to be emphasized with respect to the display of the plurality of asset images in the first display state;

displaying, in a third display state, the remaining asset images of the plurality of asset images within the display upon a determination that the system assets represented by the remaining asset images are not in an alarm state, wherein displaying the remaining asset images in the third display state causes the remaining asset images to be de-emphasized with respect to the display of the plurality of asset images in first display state;

hiding, in a fourth display state, a second asset image by obscuring the second asset image with a third asset image; and displaying in a fifth display state, the second asset image by de-emphasizing the third asset image upon a determination that a second system asset represented by the second asset image is in the alarm state, wherein the plurality of asset images comprise at least one of a machine image; and wherein each of the plurality of asset images is displayed on the display at a location that corresponds to its physical position within the system.

18. A method in accordance with claim 17, wherein displaying the first asset image in the second display state comprises alternatingly displaying the first asset image in the second display state and the first display state.

19. A method in accordance with claim 17, wherein displaying the first asset image in the second display state comprises emphasizing the first asset image based on at least one of a severity of the alarm state and an amount of time that the first system asset represented by the first asset image is in the alarm state.

20. A method in accordance with claim 17, wherein displaying the remaining asset images in the third display state comprises at least one of reducing an opacity of the remaining asset images and reducing a color palette used to display the remaining asset images.

21. A method in accordance with claim 17, further comprising selecting the first asset image and receiving measurement data for the first system asset represented by the first asset image.

22. A method in accordance with claim 21, wherein selecting the first asset image comprises selecting the first asset image based on a user input.

* * * * *